May 11, 1937. A. W. WENZEL 2,079,977
PACKING RING
Filed July 6, 1933 2 Sheets-Sheet 1

INVENTOR
Albert W. Wenzel
BY
Howard P. King
ATTORNEY

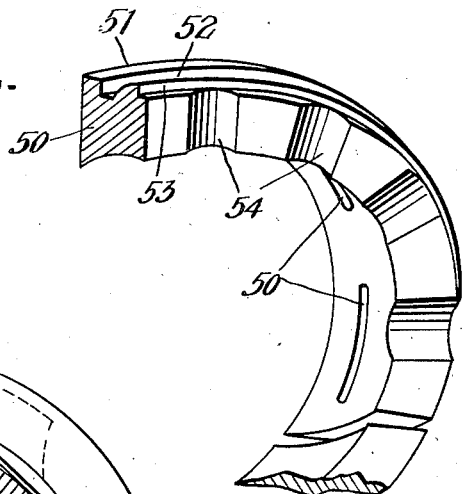
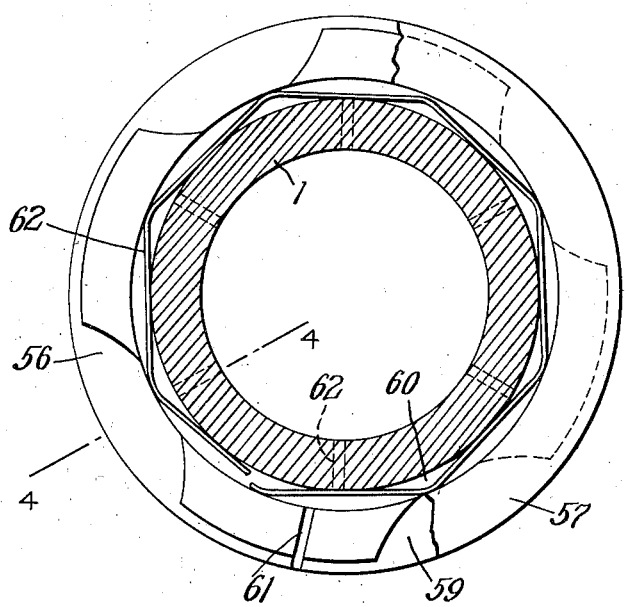
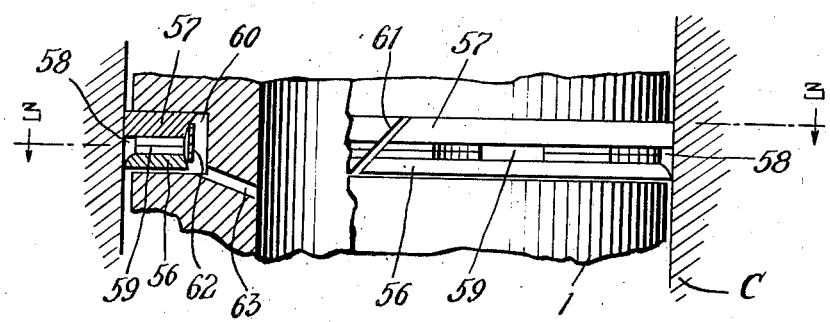

Patented May 11, 1937

2,079,977

UNITED STATES PATENT OFFICE 2,079,977

PACKING RING

Albert W. Wenzel, West Orange, N. J.

Application July 6, 1933, Serial No. 679,195

8 Claims. (Cl. 309—45)

This invention relates to packing rings and more particularly to packing rings known as piston rings and used extensively in internal combustion engines. The invention herein utilizes and improves upon features and constructions shown in prior United States Patents No. 1,642,524 of September 13, 1927, 1,677,158 of July 15, 1928, 1,710,250 of April 23, 1929 and 1,803,955 of May 5, 1931 all of which were issued to me.

The ordinary conception of piston rings is that the same are used for obtaining a sliding contact with a cylinder and for preventing leakage of compression from one end of the cylinder to the other past the piston, and it is indeed quite true that a packing ring has this primary function. It has also been found that a packing ring performs another function, namely, that of preventing the supply of oil in the crank case from becoming unduly depleted by escape past the piston rings into the combustion chamber and there burning or being ejected with the spent fuel. This likewise is an important use of piston rings. I have found that packing rings have a decided utility when properly constructed and judiciously employed for obtaining distribution of lubrication between the piston and the cylinder. Attempts heretofore have been made to wipe the oil away from the combustion end of the cylinder, and the result has often, if not always been, that the rings and piston nearest to the combustion end have either been improperly lubricated or unnecessary amounts of the oil have been passed and lost.

The objects of the present invention are to provide for adequate lubrication between a piston and a cylinder at the same time maintaining a positive seal against compression losses; to maintain an oil supply between the piston and cylinder and yet prevent the oil from passing into the combustion chamber, to carry the oil back and forth with the piston as the same reciprocates; to enable fresh oil to be received and exchanged for the oil being carried by the piston; to utilize the oil for also lubricating the ring within the piston; to maintain the ring seated both against the cylinder wall and against the wall of the groove in the piston; to utilize the oil for tightening the ring within the groove; to secure simplicity of construction and operation; and to obtain other advantages and results as may be brought out in the following description.

Referring to the accompanying drawings, in which like numerals of reference indicate similar parts throughout the several views;

Figure 2 is a perspective view of a portion of a combination ring;

Figure 3 is a view of a ring partially in section and partially in elevation showing the ring mounted in a piston shown also in section; and Figure 4 is a view of a portion of the piston and ring mounted in a cylinder, with the piston and ring partially in elevation and partially in section as upon line 4—4 of Fig. 3.

Figure 1:
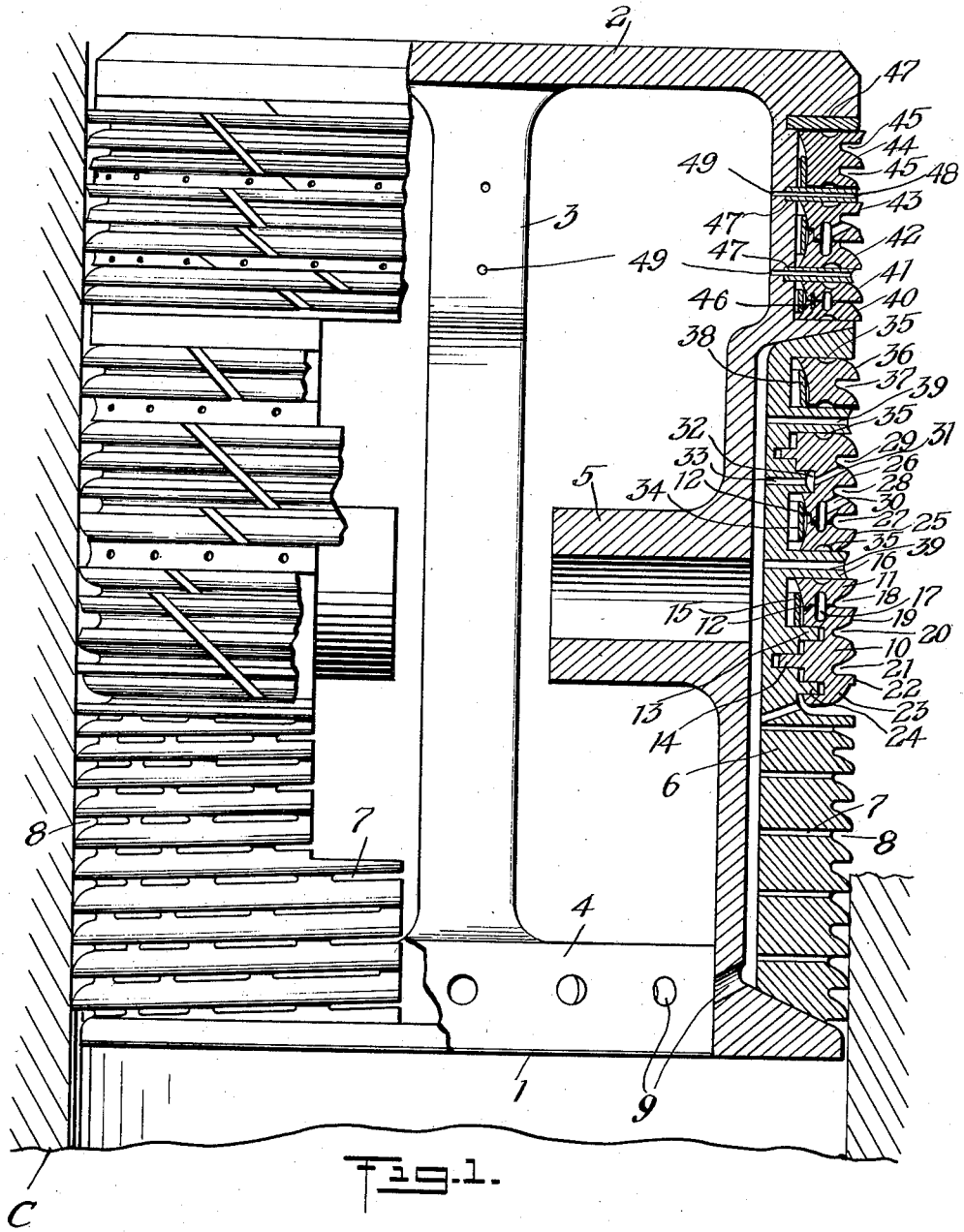
Figure 1 represents a piston partially in side elevation and partially in section, having rings applied thereto in accordance with the invention, the rings likewise being partially in elevation and broken away to show cross-sections thereof.

In the specific embodiment of the invention illustrated in said drawings, and referring more especially to Fig. 1 thereof, the reference numeral 1 indicates a piston of appropriate size and shape to be received and reciprocate within a cylinder C, for instance an engine cylinder of an internal combustion engine. For purposes of obtaining a light piston, the same may be constructed with a solid transverse head 2 from which depend at the periphery a plurality of ribs 3, the lower ends of which merge into an annular base 4 parallel to said head 2. Between the ribs, the piston is open except as closure thereof may be effected by the rings hereinafter described. Two of the ribs may carry transverse bearings 5 for receiving the usual wrist pins employed in pistons.

According to the illustration of the embodiment of my invention herein disclosed, it will be noted that the lower part of ribs 3 are inset so as to provide space to receive a long collar-like ring 6, which for convenience will be hereinafter referred to as a collar. This collar is longitudinally split with a stepped gap so that the collar may be spread for applying it to or removing it from the piston. The ends of the collar are tapered outwardly and the piston is correspondingly shaped to receive the tapers so that the tendency will be for the collar to normally expand into engagement with the cylinder, and yet will permit the collar to contract as may become necessary. The collar is normally expanded and has to be contracted to some extent to introduce it into the cylinder. I have found that use of such a collar maintains a desirable fit with the cylinder even under wear and entirely eliminates "piston slap". Furthermore, use of such a collar permits the collar to overlie the outer ends of the wrist pin, whereby a very short piston may be used or a greater throw of crankshaft or stroke obtained for a given diameter.

In order that the collar may contract within the tapering confines of the ring recess, the collar is made longitudinally compressible as by a plurality of slits 7 arranged in rows with the slits of one row staggered with respect to the next row as more fully explained in above mentioned Patent 1,710,250. In the present instance, however, I arrange these slits 7 in the bottom of a continuous helical oil groove 8 in the outer face of the collar. The utilization of a helical groove enables me to obtain a positive return of oil toward the crank case since the reciprocation of the piston and angularity of the groove obtains a moment of force upon the oil in the direction of decline of the groove. The spiral oil groove is in the surface of the collar for the portion thereof nearest the crank case of the engine. The oil not only returns to the crank case by way of the helical groove, but also passes through the collar to the interior thereof and returns to the crank case through the open piston between the ribs as well as through holes 9 in base 4. Tapering of the end seats in the piston for the collar, combined with the longitudinal and diametrical expansibility and compressibility of the collar maintains a close fit of the outer surface of the collar with the cylinder and a close fit of the ends of the collar with the piston effectively preventing any piston slap either when the device is new or after long service. This collar, as well as the several expanding rings subsequently described herein are preferably cast iron.

Preferably the oil groove 8 is of a cross-sectional configuration such that the face of the groove toward the crank case of the engine is substantially perpendicular to the cylinder wall thereby acting to scrape the oil from the cylinder wall toward the crank case. The face of the groove from the perpendicular face of one convolution to the perpendicular of the next convolution is preferably, in cross-section, a double reversed curve such that the surface approaches the outer edge of the perpendicular surface of the groove with a convex curve. This curvature has a tendency to permit the surface to ride over the oil when the piston is moving in that direction. Reciprocation of the piston with the collar thus constructed, tends to move the oil along the cylinder wall in a direction away from the combustion chamber. Nevertheless, it is intended that considerable oil shall pass above the helically grooved part of the collar so as to obtain lubrication thereabove. The number of convolutions of the helical groove and the nicety of fit of this part of the collar with the cylinder may be varied as found desirable or necessary. The utilization of the perpendicular or oil-conveying groove surface with the convex oil-passing surface sloping outward toward the cylinder wall enables the collar to wear as may be required at the peaks thus formed and obtains a fit within the piston very quickly in the same manner as described in connection with the aforementioned Patent 1,642,524. It is to be noted, however, that the curvature of the groove surface in the present instance renders the surface oil passing, which is not obtained by the concave curvature shown in that prior patent.

The upper section of the cylindrical portion of the collar 6 is provided with a plurality of peripheral grooves to receive expansible rings therein, these rings being split to enable the same to expand and thus obtain a more positive engagement with the wall of the cylinder than is obtained by the lower portion of the collar. These rings are preferably of improved construction, and will now be described, reference being made first to the lowermost ring illustrated as carried by the collar. This lowermost ring is preferably a double ring having one section 10 which is engaged at its upper edge (as viewed in the drawings) by another section 11. These two sections preferably have an interfitting mortise 12 so as to still prevent passage of gases when the two sections otherwise separate slightly when hugging opposite walls of the groove. The groove receiving the composite ring made up of sections 10 and 11 may have a stepped bottom wall such that a portion of land 13 will project into an inner groove of the ring and reversely, an inner tongue 14 on the ring projects into a narrow portion of the groove thereby obtaining a positive seal against passage of gases or compression around the inside of the ring between it and the collar. At the portion of the ring where the sections 10 and 11 meet, the inner circumference or face of the ring is curved with an offset center of curvature thereby bringing the upper inner corner of the ring closer to the bottom of the groove than the corner of the ring next to the face of land 13. An inner resilient expander 15 positioned within the groove and tending to expand against this curved surface of the ring, produces a moment of force tending to force the ring section 11 against the upper face of the groove or land 16. Likewise, within the ring is an oil channel 17 part of which is within one section 10 of the ring and part of which is within the other section of the ring, the parts of said channel being juxtaposed. As oil finds its way into this channel and as the oil pressure increases within the channel, both this pressure and the moment of force exerted by expander 15 will tend to seat section 11 of the ring against land 16.

Preferably sections 10 and 11 combine at their meeting face to provide a peripheral oil groove 18 similar in cross-sectional configuration to groove 8 in the collar heretofore described. In other words, the groove 18 has an oil-conveying face and an oil-passing face. As here shown, the oil-conveying face is arranged to move the oil toward the combustion chamber, whereas the oil-passing face is arranged to slide over the oil on the down stroke and permit the oil to pass to the ring next beyond. The fact that this groove has an oil-conveying face will operate to create an oil pressure within the groove as the face gathers oil in moving forward. The ring sections have more than normal clearance between the opposite side walls of the retaining groove in the piston. The pressure of the oil will have a tendency to separate the sections 10 and 11, and since the division between the sections is within the ring groove 18, the oil will be forced into channel 17 where the pressure is desired as heretofore explained. Mortise 12 prevents escape of the oil to the inside of the piston, so that a material pressure is obtained and maintained in the channel to spread the ring in an axial direction.

It is to be noted that section 10 of this ring is provided with a shallow concavity 19 such as described in aforementioned Patent 1,677,158 which obtains a quick seating for the outer peripheral surface of the ring, this concavity being exaggerated for greater clearness in the drawings. In the middle of the concavity is provided a groove 20 for maintaining a supply of oil therein as the piston moves back and forth. This particular ring is furthermore shown as having another groove 21 and a peripheral surface 22 for oil-sealing purposes toward the lower edge of the ring. From this lower peripheral portion 22 the ring curves inwardly downward providing a flange 23 for deflecting the oil and obtaining a partial seal with a projecting ridge of land 24. The lower face of this flange has more than normal ring-clearance with respect to the collar, thus providing an oil collecting groove, from which return ducts will carry the oil to the inside of the collar.

Referring now to the next or middle ring shown in the collar, it will be observed that the same also is composed of sections 25 and 26 which have an overlapping tenon 12 as in the ring above described and the ring also has a channel 17 in the meeting faces of the two sections. Whereas the function of the preceding ring was to carry oil along the cylinder surface with the upstroke of the piston, this middle ring may be employed to reverse the carrying of the oil and bring the oil down the cylinder upon the downstroke of the piston. The first section 25 of the ring nearest the first-mentioned ring is shown as providing an oil-conveying face for carrying the oil upward, separated by a groove 27 from an oppositely directed oil-conveying face which will carry the oil downwardly. Above oil groove 27, are two other oil grooves, 28 and 29, all in the outer circumference of section 26 of the ring. An oil duct 30 is shown connecting oil groove 28 with channel 17, and an oil duct 31 is shown from oil groove 29 to the inner circumference of the ring. This duct leads to a part of the ring which is above the end of a ridge of land 32, and it is to be noted that the outer edge of this ridge of land is concave, thereby providing a positive space for the oil directed to it by duct 31. This land 32 may be pierced by a plurality of ducts 33 passing to the inside circumference of the collar or other parts in which the ring is mounted. It is furthermore to be noted that all of the peaks or outermost circumferences of the ring have one face approaching the peak with a convex curvature, thereby forming an oil-passing surface upon movement of the piston in one direction. At the part of the ring where the sections meet, the inner circumference thereof may be made concave, and within the space thus provided is mounted an expander 34. Expanders are well known in the art, and comprise a split "ring" or polygon the sides of which lie tangentially within the ring groove and the apexes of which engage the inner side or circumference of the ring. The extreme opposite edges of the ring being described are provided, according to my invention, with concave oil grooves 35 so as to lubricate the ring with respect to the land or face of the groove containing the ring. Let it be said here, and to save further repetition, that this multi-section ring, like the one above-described and like the subsequently described multi-section rings, has a channel with a mortise between the channel and the inner circumference of the ring for building up an oil pressure for spreading the ring which in each instance has more than normal ring clearance between the parallel faces of the retaining groove of the cylinder-engaging member whether sleeve or piston.

The uppermost ring 36 of the group of rings shown in the collar is a single section, that is to say, does not have two sections as described in connection with the other rings. This uppermost ring is shown with a middle oil groove 37, one face of which is oil-conveying and the other face of which is oil-passing. The oil-conveying face is preferably directed downward so as to assist in carrying the oil away from the combustion chamber. Furthermore, the lower edge of this ring is likewise oil-conveying whereas the upper edge is rounded with a convex curvature so as to be oil-passing. The opposite edges of the ring are provided with oil grooves 35 as heretofore described in connection with the middle ring. The inner circumference of this upper ring is preferably eccentrically concave and has an expander 38 engaging this concave surface tending both to expand the ring and to spread it thereby holding the upper section against the upper wall of the groove of the member in which the ring is mounted.

It is desirable to here call attention to the fact that it is preferable to provide the lands which intervene between the several rings above described with concave outer circumferences so as to form channels for oil between the rings. These lands between the rings are pierced with ducts 39 from the concave outer circumference thereof to the inner circumference of the collar. Oil accumulating within the concave circumferences may be carried off by said ducts.

The several rings above described are primarily for oil-controlling purposes. They have been shown in a collar, but may be used directly in a piston if so desired. Furthermore, the piston may have its head 2 immediately above the collar if so preferred, thereby shortening the length of the piston to an even greater extent than actually illustrated. Of course if no other rings are used above the collar, the uppermost ring in the collar would be of the compression retaining type rather than oil-conveying. In the present showing, however, I have illustrated in the piston above the collar a plurality of rings, the lower one of which is oil-controlling, whereas the upper two are combination rings, that is, rings which have upper edges for preventing passage of compression, and lower portions which are oil-controlling. For purposes of identification, of the three rings shown directly in the piston, the lowermost comprises sections 40 and 41, the next or middle ring comprises sections 42 and 43 and the uppermost, which is a compression-controlling combination ring, comprises a single ring 44 with a pair of grooves 45, 45.

All of the rings which comprise two or more sections, preferably are provided with an interfitting mortise, such as the mortise 12 heretofore described. It is, however, within the scope of the invention to utilize other specific means for obtaining such a mortise. For instance, in connection with the ring composed of sections 40 and 41, there is shown a channel in the engaging faces of said sections, a portion of the channel being in each section with the portions juxtaposed. Within this channel is positioned a thin ring 46 substantially fitting the channel and acting as a mortise for sealing against passage of oil or compression.

All of the piston rings above described are of the expander type, that is to say, are split crosswise in any desired manner as by the diagonal cuts shown at the left side of Fig. 1. The normal resiliency of the rings tends to expand them and thus hold the outer circumferences thereof against the cylinder wall.

I wish to emphasize at this time, the beneficial effect obtained in my improved rings by the concave inner circumference shown and above described. In the manufacture of rings, especially those in which metal is removed from one edge, there is a decided tendency to warp, the warping usually occurring as a rolling of the metal of the ring about its cross-sectional center of gravity. Under such conditions, the outer face of the ring is out of parallel with the wall of the cylinder, and one edge of the ring therefore "bites" into the cylinder wall whereas the other edge is loose with respect to the cylinder wall. I accordingly take advantage of this phenomenon which I have discovered, by concaving the inner circumference eccentrically and thereby obtain a desired warping of the ring. Let me add, at this time also, that I have found the tendency of the ring is to warp (considered in cross-section) outward at the corner diagonally opposite from the corner where metal has been removed. Considering, then, the uppermost or combination compression sealing ring 44 shown in the piston, both outer corners extend to the full diameter of the ring, and therefore create no tendency to warp, but the inner circumference being concaved thereby removing metal from the lower inner edge as viewed in the drawings, said ring will tend to warp to protrude the upper outer edge thereof more than the lower outer edge. That is the desired condition for the ring in question, for the upper outer edge seals against the engine compression, whereas the remainder of the outer part of the ring is for oil controlling purposes. Again, as to section 43 of the next ring, the concave cutting away at the inner lower side, tends to warp the upper outer periphery into tight contact with the cylinder. Even after the rings are "worn in" by use, the inherent resiliency continues to act most strongly toward the same edge.

A more complex situation arises in connection with the lower section 42 of this middle ring of the series in the piston. It will be observed there that the upper outer corner is cut away for forming the convex oil-passing surface of the ring. Such a cut away at the corner of the ring tends to warp it so the diagonally opposite corner, namely the inner lower corner as shown in the drawings would tend to warp inwardly. This, however, is counteracted by the concave inner circumference which shortens the upper face of the ring section next the inner circumference. By this shortening of the upper face, the diagonally opposite corner, that is, the outer lower corner of the ring tends to warp outwardly, and since these two tendencies to warp are opposed, the ring remains in normal condition, that is, with its upper and lower faces parallel and perpendicular to the cylinder wall. It is, accordingly, to be understood, that reference herein to cutting away corners to produce a warping, may in one instance leave the ring in a warped condition where that is desired, or may counteract another warping tendency and actually leave the ring in a final condition without any warp.

As packing rings are used, there is a constant wearing between the ring and the wall of the groove which retains the ring in the piston. This wearing results in a very irregular side wall for the groove such that the groove is ultimately wider at its outer part than at its inner part. Consequently, when new rings are applied to the piston to replace the worn rings, the new rings will either fit too snugly at the inner part of the grooves or will be too loose at the outer part of the grooves. As a feature of the present invention, I have shown the groove walls (in the several grooves for rings in the piston wall) as consisting of contracting rings 47. The body of the piston is grooved somewhat deeper to receive these contracting rings than the depth of the grooves for the expanding rings as here shown, and consequently the several contacting rings will always remain at properly spaced positions during use. When the expanding rings are replaced, these contracting rings will also be replaced, if worn, and the assembly will again have a perfect fit. Preferably the contracting rings are of steel and will accordingly last for a great while and will not have to be replaced as frequently as the expanding rings which have to be of softer metal so as not to unduly wear the cylinders with which they have constant contact. If so desired, the outer circumferences of these contracting rings may be concave for providing oil grooves. Oil ducts from the outside to the inside of the contracting rings may be provided, as at 48, if so desired, except that the upper one of these rings cannot have such ducts as loss of compression in the combustion chamber would result. These several ducts 48 may be arranged to register with like ducts 49 through the inner wall of the piston.

Referring now more specifically to Figure 2, there is shown a combination compression-retaining and oil-controlling ring 50, the inner circumference of which is shown eccentrically concave with a compression sealing edge 51 diagonally opposite from the corner cut away by the concaving. Said edge 51, accordingly tends to warp outwardly obtaining the desired outward pressure along that edge. An outer groove 52 is formed in the cylindrical face of the ring, the face of this groove away from said edge 51 being convex for rendering the same oil-passing, and coming to a stepped edge 53 directed oppositely from said compression sealing edge. By virtue of the stepped construction of said edge, I am enabled to provide a plurality of radially disposed indentations 54 by which oil, wiped by edge 53, will be passed to the inner circumference of the ring and there discharged. In passing, it may be stated that a plurality of oil passages 55 may be provided in the bottom of groove 52 through the ring to the inner circumference thereof, said passages preferably being slots. In other words, these passages may be defined as radial and as having a dimension in a direction generally parallel to the periphery of the ring which is greater than the dimension generally parallel to the axis of the ring.

In Figures 3 and 4, I have illustrated a two-piece combination ring, between which, next the outer circumference of the sections 56, 57, is an oil groove 58 at the bottom of which are passages 59 similar to those above defined as radial and as having a dimension in a direction generally parallel to the periphery of the ring which is greater than the dimension generally parallel to the axis of the ring. Furthermore, the groove 60, in the member carrying the ring, for instance, piston 1, preferably provides a clearance within the circumference of the ring for establishing an oil chamber between the ring and the base of the groove. Likewise, there is a clearance in said groove axially of the ring in excess of the normal clearance required to fit the ring in said groove. This clearance permits formation and maintenance of a layer of oil in the ring-receiving groove as well as accommodating the above-described warping of the ring. The effective outer or circumferential seating surface of one section 57 of the ring is substantially greater than the effective outer or circumferential seating surface of the other section 56 since the face of the groove to this last-mentioned surface is convex thereto for oil-passing purposes. By virtue of the concave inner circumference of the ring, the side or groove wall engaging face of one section of the ring has a greater area than the groove wall engaging face of the other section. Furthermore, part of each passage or slot 59 is in one section of the ring and part is in the other section, with the two parts juxtaposed to form the complete passage or slot. The outer circumferential surfaces of both sections of the ring are continuous circumferentially and annularly un-interrupted at the cylinder-engaging portions thereof except for very slight interruptions caused by diagonal or other splits or joints 61. It may furthermore be noted that the axial dimension of each ring section overall is greater than the axial dimension of the portion of the section in actual contact with the cylinder. Within the ring-mounting groove 60 of the member or piston 1, is mounted an expander 62. Excess oil in ring-mounting groove 60 may be drained back to the inside of the piston or member 1 by suitable ducts 63.

Obviously other detail changes and modifications may be made in the construction and use of my improvements in packing rings without departing from the spirit or scope of the invention, and I do not wish to be understood as limiting myself to the exact constructional details herein illustrated, except as set forth in the following claims when construed in the light of the prior art.

Having thus described my invention, I claim:—

1. In combination, a piston having a peripheral ring-receiving groove the end edges whereof taper inwardly, a collar in said groove having its ends correspondingly tapered and having means enabling said collar to lessen in length for compression into said groove more or less as required, said collar also providing ring-receiving grooves therein, and rings in the grooves of the collar tending to expand therein and compressible irrespective of the collar in its groove.

2. In combination, a piston having a peripheral ring-receiving groove the end edges whereof taper inwardly, a collar in said groove having its ends correspondingly tapered, said collar providing one section thereof having means enabling said collar to lengthen and compress longitudinally of the collar, and said collar providing another section which cannot vary in length and in which are provided a plurality of ring-receiving grooves, and rings in said grooves of the collar.

3. In combination, a piston having a peripheral ring-receiving groove the end edges whereof taper inwardly, a collar in said groove having its ends correspondingly tapered and having a spiral groove extending more than one convolution around the collar, said groove having slits in the bottom thereof with the slits of successive convolutions staggered with respect to each other for enabling the said collar to be longitudinally compressible, the spiral groove tending to distribute oil to the several slits and in a direction having a component toward one end of the collar.

4. The combination according to claim 3 wherein said spiral groove has one wall thereof perpendicular to the circumference and the other wall rounded.

5. The combination according to claim 3 wherein the collar is longitudinally split and the split intercepts each convolution of the spiral groove.

6. The combination according to claim 3 wherein said spiral groove has one wall thereof perpendicular to the circumference and the other wall rounded, and wherein the collar is longitudinally split.

7. The combination according to claim 3 wherein said spiral groove has one wall thereof perpendicular to the circumference and the other wall rounded, and wherein the collar is split longitudinally and the split intercepts each convolution of the spiral groove.

8. In combination, a piston having a peripheral ring-receiving groove the end edges whereof taper inwardly, a collar in said groove having its ends correspondingly tapered and having a plurality of groove convolutions around the collar, said convolutions having slits in the bottoms thereof with the slits of successive convolutions staggered with respect to each other for enabling the said collar to be longitudinally compressible, the said convolutions tending to distribute oil to the several slits and providing a multiplicity of perpendicular walls to the outer face of the collar for wiping oil from a cylinder and introducing the oil thus wiped into said convolutions and discharge the same through said slits.

ALBERT W. WENZEL.